J. E. YOST.
GAME APPARATUS.
APPLICATION FILED MAY 23, 1911.

1,005,095.

Patented Oct. 3, 1911.

Capitals
Coast Towns
Intermediate Towns

WITNESSES
Sidney Brooks
Geo. J. Hoster

INVENTOR
John E. Yost
BY Munn & Co.
ATTORNEYS

UNITED STATES PATENT OFFICE.

JOHN E. YOST, OF ARKANSAS CITY, KANSAS.

GAME APPARATUS.

1,005,095.    Specification of Letters Patent.    Patented Oct. 3, 1911.

Application filed May 23, 1911. Serial No. 628,934.

*To all whom it may concern:*

Be it known that I, JOHN E. YOST, a citizen of the United States, and a resident of Arkansas City, in the county of Cowley and State of Kansas, have invented a new and Improved Game Apparatus, of which the following is a full, clear, and exact description.

The object of the invention is to provide a new and improved game apparatus for playing a game of checkers on a map by the use of traffic routes or lines to move on, the towns along the routes as points to move to, and towns at the end of the map as "king's row."

For the purpose mentioned, use is made of a map and sets of movable pieces or pawns adapted to be moved over the map by the players from the opposite ends of the map, the latter having traffic lines, and sets of starting, finishing and intermediate stations marked on the traffic lines, one set of stations indicating the capitals of different States and being the starting points on which the movable pieces are placed on starting the game, another set of stations being the goals or finishing points and representing towns located on opposite sides of the map along the coasts, and another set of stations being the intermediate points representing towns and located along the traffic lines in addition to the starting and finishing stations.

A practical embodiment of the invention is represented in the accompanying drawings forming a part of this specification, in which similar characters of reference indicate corresponding parts in all the views.

Figure 1:
Figure 1:
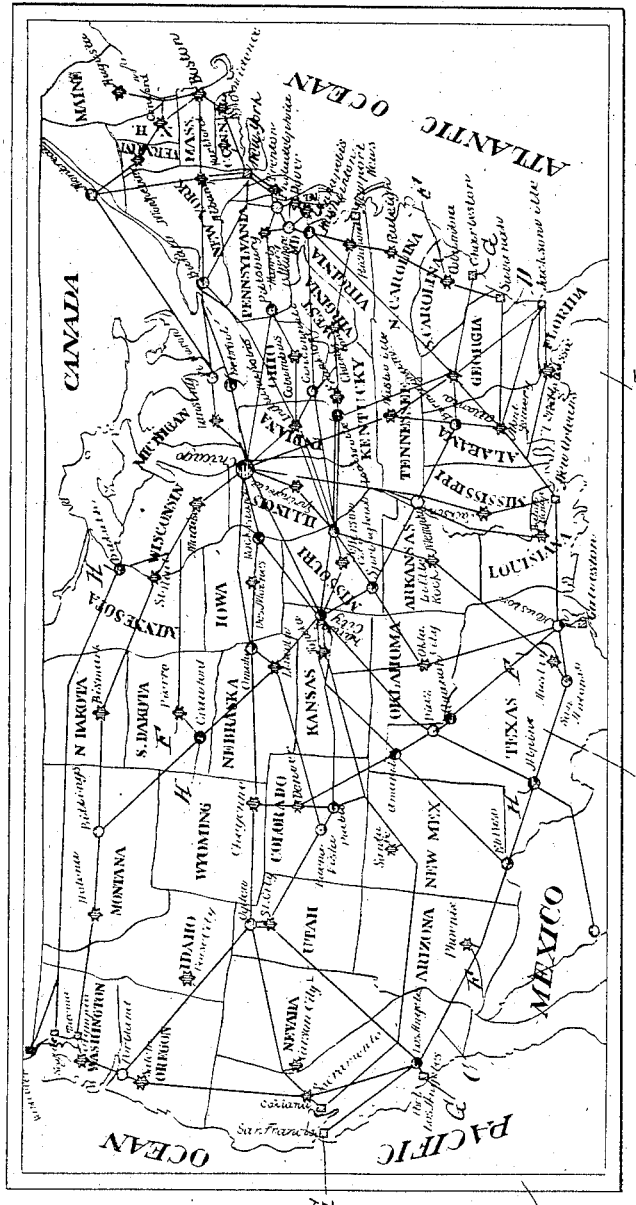
Figure 3:
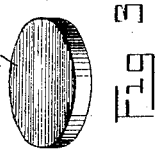
Figure 2:
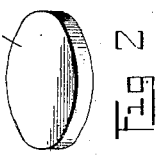

Figure 1 is a face view of the map; and Figs. 2 and 3 are perspective views of the movable pieces used by the players.

As shown in Fig. 1, a map A of the United States is mounted on a suitable board B or other support, and on the map A are arranged the forty-eight contiguous States and Territories C, and traffic lines D, on which are moved sets of pieces or pawns E and E', each set containing twenty-four pieces, and the sets being preferably of different colors. On the map are also arranged the capitals F of the different States, and preferably indicated by a star, each capital appearing on a traffic line D. Two players on opposite ends of the map A place their respective movable pieces E and E' in position on the stations F indicating the capitals of the different States and Territories, that is, one player covers the capitals of the eastern half of the United States and the other the western half of the same. On the map A are also marked stations G representing towns at both the Atlantic and Pacific ends of the map, the said stations being represented preferably by squares, and are on traffic lines D, and form the goals or finishing points. Thus the player on the right-hand side moves the movable pieces in a westerly direction over the traffic lines D to reach the finishing stations G on the Pacific coast, while the player on the left-hand side of the map moves the pawns over the traffic lines D to reach the finishing stations G on the Atlantic coast, and on the traffic lines D are further arranged intermediate stations H indicating towns in the several States in addition to the capitals and coast towns above mentioned.

The game is played approximately the same as the ordinary game of checkers, that is, the part of each player is to capture the movable pieces of his opponent. Each player strives to reach the coast or finishing stations on the opposite coast by moving a piece at a time from one station to the next following one along the traffic lines D, the players making alternate moves, and the opponent's pieces are jumped and taken off the board whenever found in a station with a vacant station beyond to alight on. Two or more may be jumped if a town station is vacant between each. After reaching a coast or finishing station at the opposite side, the movable piece is called a "traveling man" and is allowed to go in any direction on any traffic line and capture the opponent's movable pieces wherever found. Whenever a piece has to be moved three times to avoid being jumped it is then considered captured and taken off the board. The game is won by the player that captures all of his opponent's movable pieces.

It is understood that by playing the game in the manner described, it is not only highly interesting, but tends to educate the players relative to the geography of the United States.

It is understood that more or less traffic lines D may be used besides the ones shown on the map in Fig. 1, and also additional stations H may be added to render the successful playing of the game more difficult.

Having thus described my invention, I claim as new and desire to secure by Letters Patent:—

A game apparatus, comprising a map and sets of movable pieces adapted to be moved over the map by the players from opposite ends of the map, the map having traffic lines and sets of starting stations, finishing stations and intermediate stations, the said sets of stations being located upon the said traffic lines, the said starting stations indicating the capitals of different States, the said finishing stations indicating coast towns on opposite sides of the map, and the said intermediate stations indicating towns along the traffic lines in addition to the said starting and finishing stations.

In testimony whereof I have signed my name to this specification in the presence of two subscribing witnesses.

JOHN E. YOST.

Witnesses:
 B. M. DAVIS,
 L. G. ZEYEN.